United States Patent [19]

Parks

[11] 4,155,955
[45] May 22, 1979

[54] CHEMICALLY BOUND ANTIOXIDANTS

[75] Inventor: Carl R. Parks, Akron, Ohio

[73] Assignee: The Goodyear Tire & Rubber Company, Akron, Ohio

[21] Appl. No.: 831,832

[22] Filed: Sep. 9, 1977

Related U.S. Application Data

[63] Continuation of Ser. No. 719,788, Sep. 2, 1976, abandoned.

[51] Int. Cl.$^2$ .......................................... C08F 279/02
[52] U.S. Cl. ........................ 260/879; 260/45.8 A; 260/45.9 NC; 260/800; 260/808; 260/45.8 NE
[58] Field of Search ................... 260/878 R, 879, 800, 260/808, 45.85 A, 45.85 B, 45.85 E, 45.9 NC

[56] References Cited

U.S. PATENT DOCUMENTS

| | | | |
|---|---|---|---|
| 3,767,628 | 10/1973 | Kline | 260/45.9 NC |
| 3,817,916 | 6/1974 | Parks | 260/45.85 E |

FOREIGN PATENT DOCUMENTS 7502590   9/1975   Netherlands.

*Primary Examiner*—Paul R. Michl
*Attorney, Agent, or Firm*—D. B. Little

[57] ABSTRACT

Polymers are reacted with antioxidants such as N-(4-anilinophenyl) methacrylamide in the presence of a free radical initiator system of the azo, azonitrile or Redox type.

2 Claims; No Drawings

CHEMICALLY BOUND ANTIOXIDANTS

This is a continuation of application Ser. No. 719,788 filed Sept. 2, 1976, now abandoned.

This invention relates to a process for chemically bonding antioxidants into polymeric materials. More particularly this invention relates to antioxidants containing unsaturated segments and to a process of building the antioxidant into the polymeric material.

Chemically bound antioxidants have previously been incorporated in polymeric materials. There is a continuing need to find different methods for building antioxidants into polymers.

The advantages of building antioxidants into the chemical structure of polymers include the ability to resist extraction even after repeated exposure to aqueous detergent or dry-cleaning fluids. Such stabilized polymeric materials are used for carpet backing and applications where the polymer is used in solution form as in fabric treatments. These materials are also used in such applications as solvent hoses, oil seals and O-rings.

It is an object of the present invention to provide a method for chemically bonding antioxidants containing polymerizable aliphatic unsaturation in their structures into polymeric materials. Other objects will become apparent to those skilled in this art as the description proceeds.

It has now been discovered that antioxidants containing free radical polymerizable aliphatic unsaturation can be chemically bonded, i.e., built into an unvulcanized polymeric material when the antioxidant and unvulcanized polymer are combined and activated by a free radical generating material or initiator selected from the group consisting of azo initiator systems, azonitrile initiator systems and Redox initiator systems to cause the unsaturated antioxidant to react with the polymer by a free radical mechanism. The process generally comprises combining the antioxidant which contains the free radical polymerizable aliphatic unsaturation, the polymer and the azo, azonitrile or Redox initiator system and subjecting the combination to time and temperature conditions sufficient to cause the antioxidant to chemically bond with the polymer. Preferably the antioxidant is added to the polymer prior to the addition of the initiator system. Attempts to react the antioxidant with the polymer when the polymer is either in solvent form or in the form of a dry rubber have been unsuccessful. However, when the polymer is in latex form the reaction proceeds quite satisfactorily.

The term "free radical polymerizable aliphatic unsaturation" as used herein is meant to describe open chain aliphatic unsaturation of the type found in monomers capable of polymerization in free radical polymerization systems.

The polymers of the present invention can be saturated or unsaturated and can be natural or synthetic. Polymers of the present invention include those conjugated 1,3-diene monomers, such as cis-polyisoprene, cis-polybutadiene, styrene/butadiene copolymers, acrylonitrile/butadiene copolymers and polychloroprene. The method of the present invention is particularly effective with rubbery copolymers of butadiene and acrylonitrile.

Representative examples of antioxidants containing aliphatic unsaturation useful in the practice of the present invention are N-(4-anilinophenyl) methacrylamide; 3-(3,5-di-t-butyl-4-hydroxyphenyl)butyl methacrylate; 3-(3,5-di-t-butyl-4-hydroxyphenyl)propyl methacrylate; the reaction product of allyl glycidyl ether and p-aminodiphenylamine containing 3-N-(4'-anilinophenyl)amino-2-hydroxypropylallyl ether; the reaction product of N-methylol maleimide and p-aminodiphenylamine contain N-[(4-anilinophenyl)amino methyl] maleimide, and the reaction product of glycidyl methacrylate and p-aminodiphenylamine containing 3-N-(40'-anilinophenyl)amino-2-hydroxypropyl methacrylate. Mixtures of such antioxidants can be used.

Compounds representing such antioxidants are described along with their method of preparation in U.S. Pat. Nos. 3,658,769, 3,817,916 and British Pat. No. 1,358,443.

The free radical initiator systems useful in the practice of the present invention are selected from the group consisting of azo initiators and Redox initiator systems.

Redox systems are well known in the art and are comprised of reducing agents and oxidizing agents in a proportion that yields polymerization initiating species. In this respect see column 5, lines 34 to 43, column 6, lines 17 to 34 and column 7, lines 11 to 18 of U.S. Pat. No. 3,886,116, which are incorporated herein by reference.

Azo and azonitrile initiators are also extremely well known in the art. For example, see German DAS No. 1,931,452 at page 3 (bottom) and page 4, as well as the Polymer Handbook reference referred to on page 4 thereof, the pertinent portions of which are incorporated herein by reference.

The antioxidant and the polymer are reacted in the presence of the free radical initiator at a temperature normally from about 20° C. to about 100° C., with a range of from about 20° C. to about 90° C. being preferred. These temperature ranges are only guides and are not intended to be limitations.

The same precautions should be observed in the use of the free radical initiator systems as pertains to the atmosphere surrounding the reaction as are observed in free radical polymerization systems. For example, azoisobutyronitrile must be used in an inert atmosphere whereas the peroxamine system described subsequently herein can be used in the presence of air. This is not to suggest that all Redox systems are insensitive to the presence of air.

The practice of the present invention is illustrated by the following examples. All parts and percentages are by weight unless otherwise indicated.

To an 8-ounce bottle containing 100 grams of antioxidant-free 67/33 butadiene/acrylonitrile (NBR) latex was added 1.16 grams (2phr) of a 50 percent dispersion of N-(4-aninophenyl) methacrylamide. The bottle was flushed with nitrogen and rolled overnight. Azoisobutyronitrile (AIBN) in the amount of 0.29 gram (1 phm) in 5 milliliters of benzene was added from a syringe and the bottle placed in a polymerization bath and tumbled for 16 hours at 70° C. The experiment was repeated using two other antioxidants in place of the methacrylamide. In one instance, 4-(3,5-ditertbutyl-4-hydroxyphenyl)-2-butyl methacrylate was used and in the other instance 3-(4-anilinoanilino)-2-hydroxypropyl methacrylate was used.

Experiments were also conducted using the aforementioned antioxidants by substituting a Redox system for the AIBN. The Redox system consisted of 0.204 gram (0.5 phm) of a 70 percent solution of tertiary butyl hydroperoxide in 5 milliliters of benzene plus 0.145 gram (0.5 phm) of diethylenetriamine in 5 milliliters of water. The bottles were placed in a polymerization bath and tumbled for 16 hours at room temperature. It was not necessary to flush the bottles with nitrogen.

The latices resulting from the polymerizations were coagulated with an aqueous solution of potassium alum. The rubber samples were dried under vacuo for approximately 8 hours at 80° C. A portion of each rubber sample was extracted with methanol and then with a 72/28 methanol-toluene azeotrope. The extracted samples were dried in vacuo and oxygen absorption measurements made at 100° C. (740 mm.). The data are listed below.

| Antioxidant | Initiator System | Hours to 1% $O_2$ at 100° C. (Extracted) |
|---|---|---|
| N-(4-anilinophenyl) methacrylamide | AIBN | 455 |
| 4-(3,5-di-tert.butyl-4-hydroxyphenyl)-2-butyl methacrylate | AIBN | 78 |
| 3-(4-anilinoanilino)-2-hydroxypropyl methacrylate | AIBN | 382 |
| N-(4-anilinophenyl) methacrylamide | Redox | 381 |
| 4-(3,5-di-tert.butyl-4-hydroxyphenyl)-2-butyl methacrylate | Redox | 108 |
| 3-(4-anilinoanilino)-2-hydroxypropyl methacrylate | Redox | 259 |

The above data demonstrate the increased resistance to oxidative degradation. Without any stabilizer it would be expected that 1% $O_2$ would be absorbed in less than 10 hours.

While certain representative embodiments and details have been shown for the purposes of illustrating the invention, it will be apparent to those skilled in this art that various changes and modifications may be made therein without departing from the spirit or scope of the invention. I claim:

1. A process for chemically bonding antioxidants containing free radical polymerizable aliphatic unsaturation to a rubber selected from the group consisting of natural rubber, styrene/butadiene rubber and acrylonitrile/butadiene rubber which comprises reacting the antioxidant with the rubber in the presence of a free radical initiator selected from the group consisting of azo systems, azonitrile systems and Redox systems.

2. The process according to claim 3 wherein the polymeric material is a rubbery copolymer of butadiene and acrylonitrile.

* * * * *

Notice of Adverse Decision in Interference

In Interference No. 100,644, involving Patent No. 4,155,955, C.R. Parks, CHEMICALLY BOUND ANTIOXIDANTS, final judgment adverse to the patentee was rendered Oct. 1, 1981, as to claims 1 and 2.

[*Official Gazette June 8, 1982.*]

Disclaimer 4,155,955.—*Carl R. Parks*, Akron, Ohio. CHEMICALLY BOUND ANTIOXIDANTS. Patent dated May 22, 1979. Disclaimer filed Aug. 27, 1984, by the assignee, *The Goodyear Tire & Rubber Co.*

Hereby enters this disclaimer to all claims of said patent.

[*Official Gazette December 4, 1984.*]